(12) United States Patent
Cho et al.

(10) Patent No.: US 12,010,432 B2
(45) Date of Patent: Jun. 11, 2024

(54) ELECTRONIC DEVICE AND METHOD FOR DETECTING FLICKERING LIGHT SOURCE IN ELECTRONIC DEVICE

(71) Applicant: Samsung Electronics Co., Ltd., Gyeonggi-do (KR)

(72) Inventors: Jeongho Cho, Gyeonggi-do (KR); Jongah Kim, Gyeonggi-do (KR); Heewoong Yoon, Gyeonggi-do (KR); Kihyuk Lee, Gyeonggi-do (KR); Donghan Lee, Gyeonggi-do (KR); Gwangho Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 141 days.

(21) Appl. No.: 17/868,135

(22) Filed: Jul. 19, 2022

(65) Prior Publication Data

US 2023/0025006 A1 Jan. 26, 2023

Related U.S. Application Data

(63) Continuation of application No. PCT/KR2022/010453, filed on Jul. 18, 2022.

(30) Foreign Application Priority Data

Jul. 19, 2021 (KR) .................. 10-2021-0094252

(51) Int. Cl.
  *G09G 3/34* (2006.01)
  *H04N 23/745* (2023.01)
(52) U.S. Cl.
  CPC ............. *H04N 23/745* (2023.01); *G09G 3/34* (2013.01)

(58) Field of Classification Search
  CPC .......... H04N 23/745; G09G 3/34; G09G 5/10; G09G 2300/0452; G09G 2320/0209; G09G 2320/0233; G09G 3/3225; G09G 2360/144
  See application file for complete search history.

(56) References Cited

U.S. PATENT DOCUMENTS

| 2008/0165115 A1 | 7/2008 | Herz et al. |
| 2008/0165292 A1 | 7/2008 | Bling et al. |

(Continued)

FOREIGN PATENT DOCUMENTS

| CN | 109451171 A | 3/2019 |
| EP | 3 522 146 A1 | 5/2018 |

(Continued)

OTHER PUBLICATIONS

International Search Report dated Oct. 19, 2022.

*Primary Examiner* — Rodney Amadiz
(74) *Attorney, Agent, or Firm* — Cha & Reiter, LLC

(57) ABSTRACT

According to an embodiment, an electronic device may include an illuminance sensor including a first modulator obtaining a first signal for first illuminance values during a first integration time and a second modulator obtaining a second signal for second illuminance values during a second integration time, and a processor. The processor may be configured to calculate the first illuminance values and the second illuminance values based on the first and second signals, determine that an ambient light source is a flickering light source based on the second illuminance values, if obtaining display parameter information associated with an image output through the display, compensate for the first illuminance values based on the display parameter information and adjust a brightness value of the display based on the compensated first illuminance values, and if failing to obtain (Continued)

the display parameter information, adjust the brightness value of the display based on the second illuminance values.

20 Claims, 11 Drawing Sheets

(56) References Cited

U.S. PATENT DOCUMENTS

| | | |
|---|---|---|
| 2008/0284716 A1 | 11/2008 | Edwards et al. |
| 2010/0194289 A1 | 8/2010 | Katayanagi et al. |
| 2012/0075286 A1 | 3/2012 | Shim et al. |
| 2016/0277106 A1 | 9/2016 | Cha |
| 2018/0348049 A1 | 12/2018 | Yoon et al. |
| 2020/0022239 A1 | 1/2020 | Hung et al. |
| 2020/0242985 A1 | 7/2020 | Cho et al. |
| 2020/0294468 A1 | 9/2020 | Hung et al. |
| 2023/0328391 A1* | 10/2023 | Chen .................... G01J 1/4204 |

FOREIGN PATENT DOCUMENTS

| | | |
|---|---|---|
| KR | 10-2008-0064324 A | 7/2008 |
| KR | 10-2008-0075862 A | 8/2008 |
| KR | 10-2012-0032722 A | 4/2012 |
| KR | 10-1211812 B1 | 12/2012 |
| KR | 10-1457389 B1 | 11/2014 |
| KR | 10-2020-0093916 A | 8/2020 |

* cited by examiner

ELECTRONIC DEVICE AND METHOD FOR DETECTING FLICKERING LIGHT SOURCE IN ELECTRONIC DEVICE

CROSS-REFERENCE TO RELATED APPLICATION(S)

This application is a continuation of and claims priority under 35 U.S.C. § 120 to PCT International Application No. PCT/KR2022/010453, which was filed on Jul. 18, 2022, and claims priority to Korean Patent Application No. 10-2021-0094252, filed on Jul. 19, 2021, in the Korean Intellectual Property Office, the disclosure of which are incorporated by reference herein their entirety.

BACKGROUND

Technical Field

One or more embodiments disclosed herein generally relate to a method for detecting a flickering light source in an electronic device.

Description of Related Art

Development of information communication technologies and semiconductor technologies have accelerated the spread and use of various electronic devices. In particular, recent personal-portable electronic devices may perform communication and may include one or more sensors for obtaining various types of ambient information. A sensor in an electronic device may obtain various pieces of information. As such, there may be various types of sensors that can be used to obtain various types of information.

Among such sensors of the electronic device, camera sensor, ultra violet (UV) sensor, iris sensor, spectroscopic sensor, infrared (IR) (proximity/gesture) sensor, RGB sensor, and/or illuminance sensor (or ambient light (ALS) sensor) are based on light.

SUMMARY

An electronic device may include an illuminance sensor for detecting ambient brightness and adjusting the brightness of the display, and it may measure the illuminance values during an integration time, which may refer to a time period in which the illuminance sensor is activated.

Further, since the illuminance sensor may be influenced by the display if it is placed under the display when the electronic device is viewed is viewed from the front, typically a short integration time is set. However, in a case where the screen brightness darkens while the display displays a screen repeatedly on and off, if the off time of the display is prolonged, the integration time is lengthened for measuring the ambient brightness. In this case, if the ambient light source is a flickering light source, and the display-off time and the off time of the flickering light source overlap, the surroundings may be determined to be dark even when it is bright due to the flickering light source, and the brightness of the display may be incorrectly set to be low. The flickering light source refer to a light source that flickers, but the flicker is not perceivable by human eyes, example of which may be a fluorescent lamp, an LED lamp, a TV, and/or a monitor. The flickering light source repeats brightening and darkening in a short cycle while flickering. If the sensing interval of the illuminance sensor is also short, and sensing is performed during when the light source is dark, the illuminance sensor may incorrectly detect the ambient brightness.

One or more embodiments disclosed herein generally relate to a method for detecting a flickering light source by an electronic device.

According to an embodiment, an electronic device may comprise a housing including a front surface and a rear surface facing in a direction opposite to the front surface, a display included in the housing and visually exposed through a portion of the front surface, an illuminance sensor including a first modulator obtaining a first signal for first illuminance values during a first integration time and a second modulator obtaining a second signal for second illuminance values during a second integration time and disposed between the display and the rear surface to overlap an area of the display when viewed from above the front surface, the first modulator and the second modulator operating at least partially simultaneously, and a processor positioned in the housing and operatively connected with the display. The processor may be configured to calculate the first illuminance values based on the first signal obtained through the first modulator, calculate the second illuminance values based on the second signal obtained through the second modulator, determine that an ambient light source is a flickering light source based on the second illuminance values, if obtaining display parameter information associated with an image output through the display, compensate for the first illuminance values based on the display parameter information and adjust a brightness value of the display based on the compensated first illuminance values, and if failing to obtain the display parameter information, adjust the brightness value of the display based on the second illuminance values.

According to an embodiment, a method for detecting a flickering light source surrounding an electronic device may comprise calculating first illuminance values based on a first signal obtained from a first modulator included in an illuminance sensor during a first integration time, calculating second illuminance values based on a second signal obtained from a second modulator included in the illuminance sensor during a second integration time, determining that an ambient light source is the flickering light source based on the second illuminance values, when obtaining display parameter information associated with an image output through a display of the electronic device, compensating for the first illuminance values based on the display parameter information and adjusting a brightness value of the display based on the compensated first illuminance values, and when failing to obtain the display parameter information, adjusting the brightness value of the display based on the second illuminance values. The first modulator and the second modulator may operate at least partially simultaneously.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which.

With regard to description of drawings, the same or similar components will be marked by the same or similar reference numerals.

DETAILED DESCRIPTION

According to certain embodiments, it is possible to avoid malfunction of the display, specifically incorrectly darkening the display even when there is an ambient flickering light source, in an electronic device with an illuminance sensor placed under the display.

Figure 1:
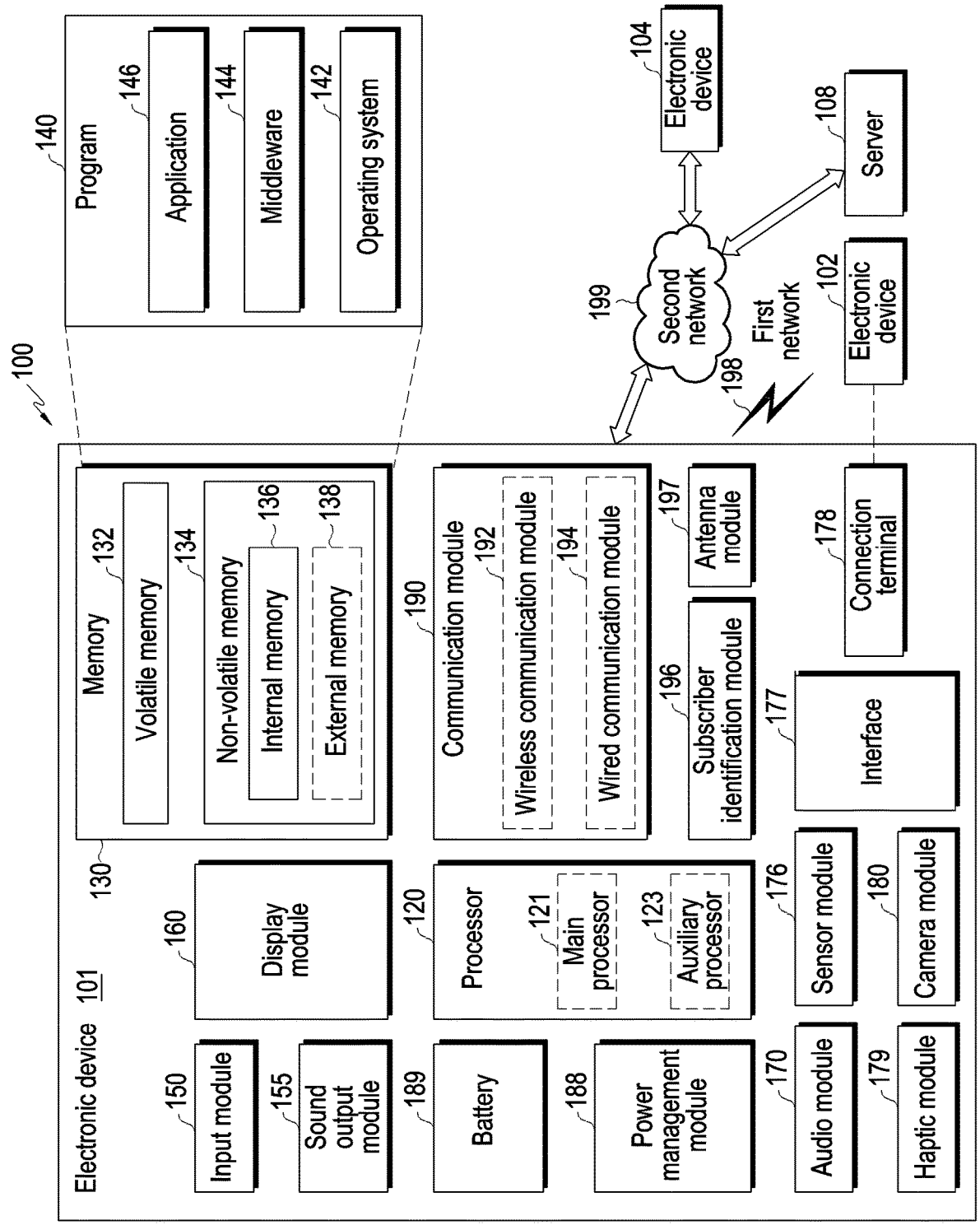
FIG. 1 is a view illustrating an electronic device in a network environment according to an embodiment.

FIG. 1 is a block diagram illustrating an electronic device 101 in a network environment 100 according to an embodiment. Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2:
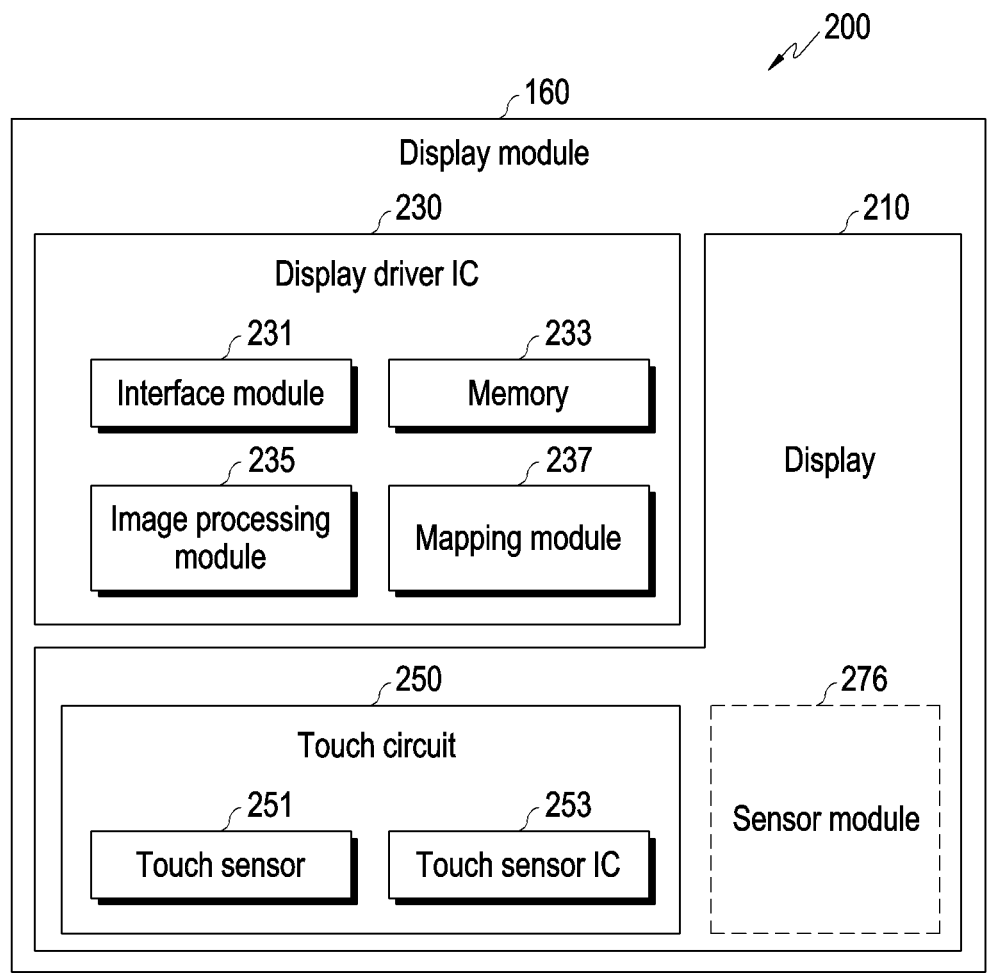
FIG. 2 is a block diagram illustrating a display device according to an embodiment.

FIG. 2 is a block diagram 200 illustrating a display module 160 according to an embodiment.

Referring to FIG. 2, the display module 160 may include a display 210 and a display driver integrated circuit (DDI) 230 to control the display 110. The DDI 230 may include an interface module 231, memory 233 (e.g., buffer memory), an image processing module 235, or a mapping module 237. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 250 or the sensor module 276 (e.g., the sensor module 176 of FIG. 1) via the interface module 231. The DDI 230 may also store at least part of the received image information in the memory 233, for example, on a frame by frame basis. The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210. The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel) of the display 210. At least some pixels of the display 210 may be driven, for example, based at least in part on the voltage value or the current value such that visual information (e.g., a text, an image, or an icon) corresponding to the image data may be displayed via the display 210.

According to an embodiment, the display module 160 may further include the touch circuitry 250. The touch circuitry 250 may include a touch sensor 251 and a touch sensor IC 253 to control the touch sensor 151. The touch sensor IC 253 may control the touch sensor 251 to sense a touch input or a hovering input with respect to a certain position on the display 210. To achieve this, for example, the touch sensor IC 253 may detect (e.g., measure) a change in a signal (e.g., a voltage, a quantity of light, a resistance, or a quantity of one or more electric charges) corresponding to the certain position on the display 210. The touch sensor IC 253 may provide input information (e.g., a position, an area, a pressure, or a time) indicative of the touch input or the hovering input detected to the processor (e.g., the processor 120 of FIG. 1). According to an embodiment, at least part (e.g., the touch sensor IC 253) of the touch circuitry 250 may be formed as part of the display 210 or the DDI 230, or as part of another component (e.g., the auxiliary processor 123) disposed outside the display module 160.

According to an embodiment, the display module 160 may further include at least one sensor (e.g., a fingerprint sensor, an iris sensor, a pressure sensor, or an illuminance sensor) of the sensor module 276 or a control circuit for the at least one sensor. In such a case, the at least one sensor or the control circuit for the at least one sensor may be embedded in one portion of a component (e.g., the display 210, the DDI 230, or the touch circuitry 250)) of the display module 160. For example, when the sensor module 276 embedded in the display module 160 includes a biometric sensor (e.g., a fingerprint sensor), the biometric sensor may obtain biometric information (e.g., a fingerprint image) corresponding to a touch input received via a portion of the display 210. As another example, when the sensor module 276 embedded in the display module 160 includes a pressure sensor, the pressure sensor may obtain pressure information corresponding to a touch input received via a partial or whole area of the display 210. According to an embodiment, the touch sensor 251 or the sensor module 276 may be disposed between pixels in a pixel layer of the display 210, or over or under the pixel layer.

Figure 3A:
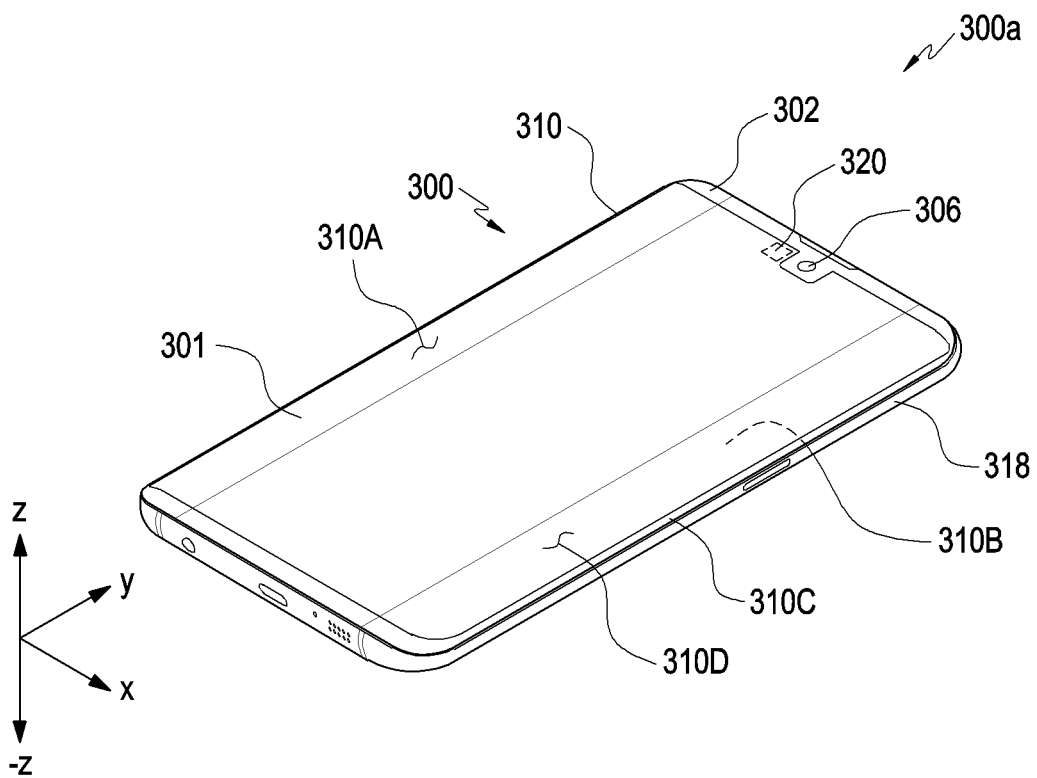
FIG. 3A is a front perspective view illustrating an electronic device according to an embodiment.

FIG. 3A is a front perspective view illustrating an electronic device according to an embodiment.

Referring to FIG. 3A, according to an embodiment, an electronic device 300a may include a housing 310 including a first surface (or front surface) 310A, a second surface (or rear surface) 310B, and a side surface 310C surrounding the space between the first surface 310A and the second surface 310B. The electronic device 300a may include a display 301, an illuminance sensor 320, and/or a camera module 306.

The display 301 may be visually exposed through a significant portion of the front plate 302, i.e. the significant portion of the front plate 302 may be transparent. According to an embodiment, at least a portion of the display 301 may be exposed through the front plate 302 forming the first surface 310A and the first regions 310D of the side surface 310C. According to an embodiment, the edge of the display 301 may be in substantially the same shape as the adjacent outer edge of the front plate 302. According to an embodiment (not shown), the interval between the outer edge of the display 301 and the outer edge of the front plate 302 may remain substantially even to maximize the active area of the display 301.

The camera module 306 may include a camera module 306 disposed in the upper center portion of the first surface (or front surface) 310A included in the housing 310 and at least one camera module (not shown) disposed on the second surface 310B. The camera modules may include one or more lenses, image sensor, and/or image signal processor.

The illuminance sensor 320 may be disposed between the display 301 and the second surface (or rear surface) 310B to overlap an area of the display 301 adjacent to the upper center portion of the front surface 310A when the electronic device 300a is viewed from the front. The illuminance sensor 320 may measure external illuminance based on the strength of the light incident from the ambient environment of the electronic device 300a. The illuminance sensor 320 may receive the external light to measure, identify, or determine the illuminance of the environment in which the electronic device 300a is positioned. The illuminance sensor 320 may include a light receiving element, such as a photodiode (PD) capable of receiving light.

According to an embodiment, the illuminance sensor 320 may include a proximity illuminance sensor which is a combination of an illuminance sensor and a proximity sensor in one device (or module). According to some embodiments, the illuminance sensor 320 may include various sensors that operate (or sense) based on light, such as picker sensor, flicker sensor, color sensor, and/or a spectrometer.

Figure 3B:
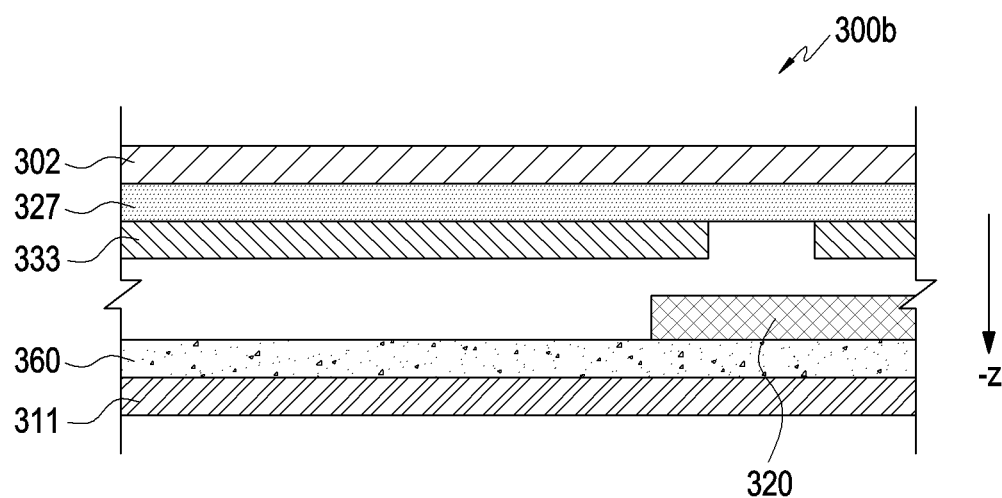
FIG. 3B is a cross-sectional view illustrating an electronic device according to an embodiment.

FIG. 3B is a cross-sectional view illustrating an electronic device according to an embodiment.

Referring to FIG. 3B, according to an embodiment, a front plate 302, a display panel 327, and a cover panel 333 may be stacked in one direction (e.g., the −z-axis direction) from the first surface (or front surface) 310A to the second surface (or rear surface) 310B. As viewed in this direction (e.g., the −z-axis direction from the first surface (or front surface) 310A to the second surface (or rear surface) 310B), the illuminance sensor 320 may be disposed between the display panel 327 and the rear plate 311 to overlap an area of the display panel 327. According to an embodiment, the display panel 327 may include a touch screen panel.

The display panel 327 may include a plurality of pixels that in turn each include red (R) subpixels, green (G) subpixels, and blue (B) subpixels. As data and power are provided to each of the plurality of pixels, the display panel 327 may output images generated from the combined colored light produced by the subpixels of the pixels.

The cover panel 333 may be electrically connected to the ground of the display panel 327. The cover panel 333 may absorb noise signals (i.e. discharge the noise signals through the ground). The cover panel 333 may be attached to the housing 310, with a dielectric interposed therebetween to prevent itself from being grounded with the housing 310. The cover panel 333 may include a copper sheet. Since the cover panel 333 cannot transmit light, a partial area thereof may be open in the position and/or size corresponding to the field of view (FOV) of the illuminance sensor 320.

According to an embodiment, the cover panel 333 may include an embo layer. For example, a partial area of the embo layer may be open in accordance with the FOV of the illuminance sensor 320.

According to an embodiment, the illuminance sensor 320 may have an under display sensor structure and be disposed under the display panel 327. The illuminance sensor may include a light receiving unit for receiving external light incident through the display 301 from outside of the electronic device 300b. A circuit board 360 may be disposed under the illuminance sensor and be electrically connected with the illuminance sensor 320.

According to another embodiment, unlike the one shown in FIG. 3B, the illuminance sensor 320 may have an in-display sensor structure and be integrated with the display panel 327 and be formed in the display panel 327. In the in-display sensor structure, the illuminance sensor is deposited immediately on the cell, like in the "on cell touch AMOLED (OCTA)" structure which is a type of touchscreen panel technique.

According to an embodiment, various electronic components, such as processor (e.g., the processor 120 of FIG. 1), memory (e.g., the memory 130 of FIG. 1), interface 177, and/or communication module (e.g., the communication module 190 of FIG. 1), may be disposed on the circuit board 360. The circuit board 360 may be fastened to the housing 310 by a coupling member (not shown), e.g., screw(s). The circuit board 360 may be electrically connected with the housing 310 to be utilized as the ground for the antenna. According to an embodiment, the circuit board 360 is not so limited and may rather be used as a feeder for applying power to the antenna radiator. For example, the circuit board 360 may include a printed circuit board (PCB) or a flexible printed circuit board (FPCB). According to an embodiment, the illuminance sensor 320 may be disposed on the circuit board 360. For example, the illuminance sensor 320 may be disposed on the circuit board 360 to be electrically connected with the processor 120. As another example, the illuminance sensor 320 may be disposed on the display 301, when the illuminance sensor 320 is the in-display type. For example, the illuminance sensor 320 may be disposed on the display 301 and operatively connected with the processor 120. The processor may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed as means-plus-function, unless the element is expressly recited using the phrase "means for." In addition, an artisan understands and appreciates that a "processor" or "microprocessor" may be hardware in the claimed disclosure.

Figure 4A:
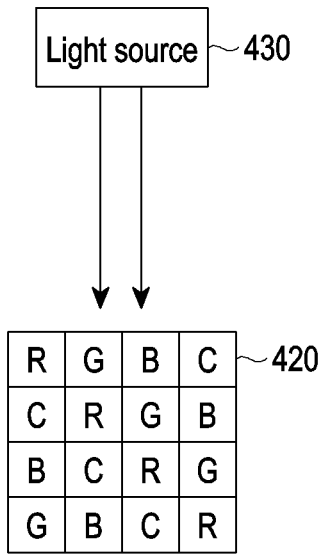
FIGS. 4A to 4C are diagrams and a graph illustrating an operation of obtaining illuminance values by an illuminance sensor in an electronic device according to an embodiment.
Figure 4B:
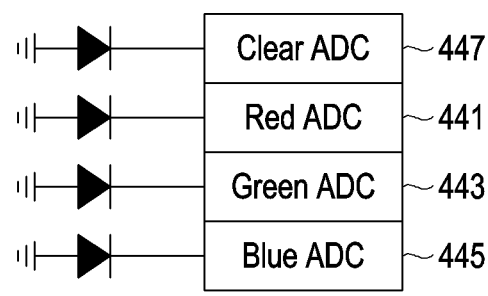
Figure 4C:
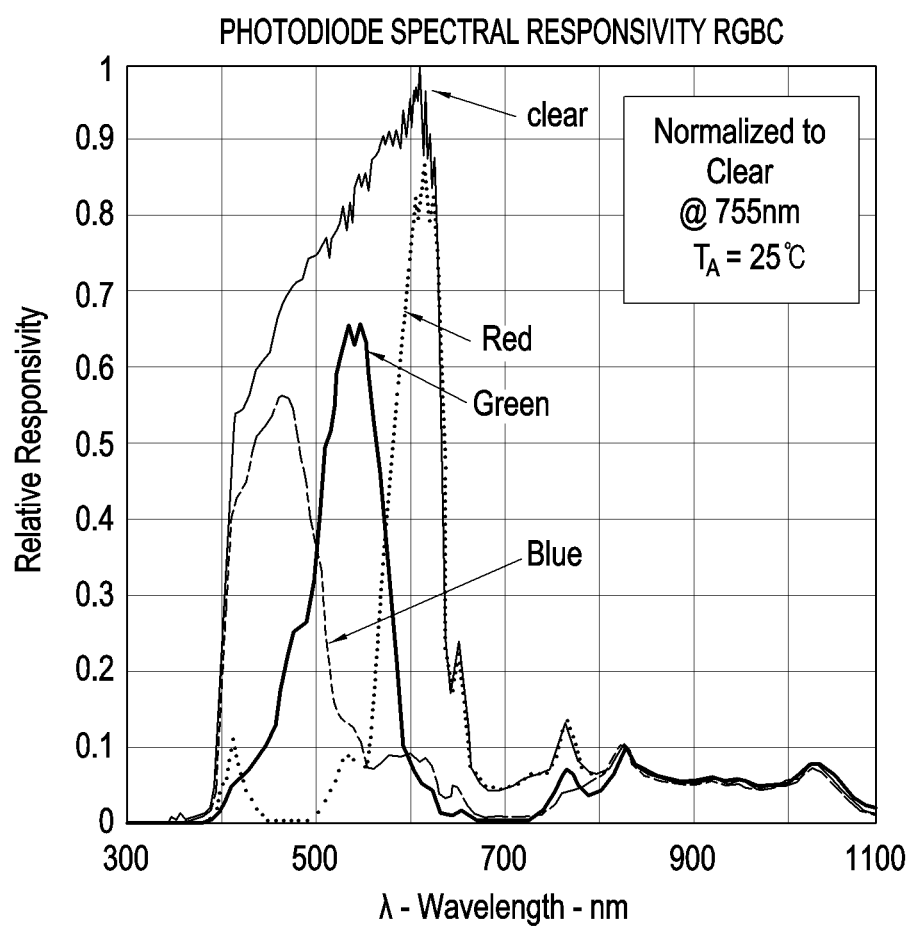

FIGS. 4A to 4C are diagrams and a graph illustrating an operation of obtaining illuminance values by an illuminance sensor in an electronic device according to an embodiment.

According to an embodiment, the illuminance sensor (e.g., the illuminance sensor 320 of FIG. 3A) may receive external light using the light receiving unit 420.

According to an embodiment, the illuminance sensor may measure the amount of light in the various wavelength bands in the R (red) channel, the G (green) channel, the B (blue) channel, and the C (clear) channel, remove the IR (infrared) component included in visible light using the C (clear) channel, distinguish the light source through the ratio of the channels to distinguish the type of light (e.g., incandescent or halogen), and calculate illuminance values by using modeling of each light source.

Referring to FIGS. 4A and 4B, when light 430 is incident on the light receiving unit 420 composed of 16 4×4 photodiode arrays, the illuminance sensor (e.g., the illuminance sensor 320) may convert analog electrical signals, individually corresponding to the R (red) light quantity, G (green) light quantity, B (blue) light quantity, and C (clear) light quantity, into digital values or digital signals through ADCs (analog-digital converters) 441, 443, 445, and 447. R (red) light quantity, G (green) light quantity, B (blue) light quantity, and C (clear) light quantity may be the intensity of light received from the R channel, the G channel, the B channel, and the C channel, respectively. According to an embodiment, the illuminance sensor may store the digital values, converted through the ADCs 441, 443, 445, and 447, in buffers (e.g., buffers individually connected to the ADCs) in first-in first-out (FIFO) manner. The processor (e.g., the processor 120 of FIG. 1) or a sensor hub (not shown) may obtain digital values (e.g., raw data measured by the illuminance sensor) stored in the buffers in designated cycles. For example, the processor may perform polling or sampling every about 20 ms to obtain raw data measured by the illuminance sensor.

According to an embodiment, the processor or sensor hub may determine the light source by analyzing the ratio of the R value, G value, B value, and C value converted into the digital values and may calculate illuminance values after determining the light source.

According to an embodiment, the light receiving unit 420 may include a plurality of channels, e.g., the R channel, the G channel, the B channel, and the C channel, and may also include two channels (e.g., the C channel and an IR channel) capable of receiving visible light and IR-band light. The channels may include a plurality of light receiving elements capable of receiving light. For example, each of the R channel, the G channel, the B channel, and the C channel may include a plurality (e.g., four) photodiodes capable of receiving external light.

Referring to FIG. 4C, the R channel may receive light in the wavelength band ranging from about 550 nm to about 700 nm, centering around 650 nm. The G channel may receive light in the wavelength band ranging from about 450 nm to about 650 nm, centering around about 550 nm. The B channel may receive light in the wavelength band ranging from about 400 nm to about 550 nm, centering around about 450 nm. The C channel may receive light (e.g., visible light band of light) in the wavelength band ranging from about 400 nm to about 750 nm.

Figure 5:
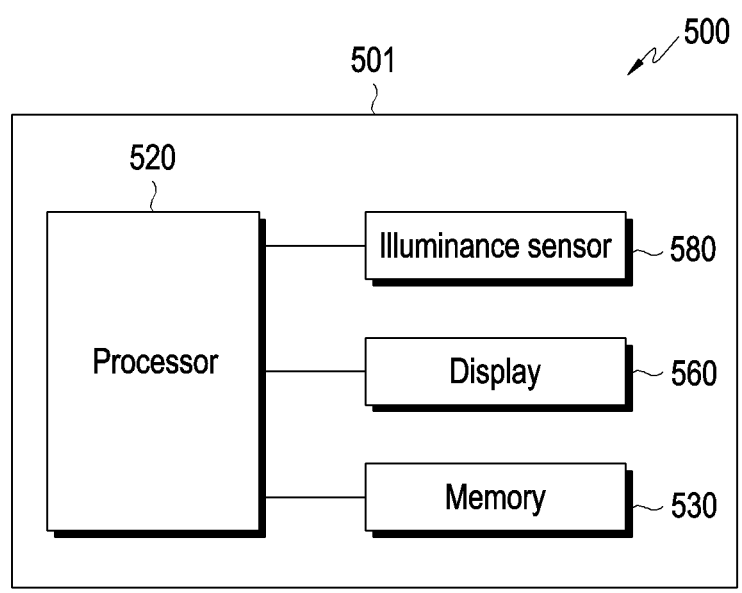
FIG. 5 is a block diagram illustrating an electronic device according to an embodiment.

FIG. 5 is a block diagram 500 illustrating an electronic device according to an embodiment.

Referring to FIG. 5, according to an embodiment, the electronic device 501 (e.g., the electronic device 101 of FIG. 1, the electronic device 300a of FIG. 3A, or the electronic device 501 of FIG. 5) may include an illuminance sensor 580, a processor 520, a display 560, and/or a memory 530.

According to an embodiment, the electronic device may include one illuminance sensor 580 or a plurality of illuminance sensors 580.

According to an embodiment, the flickering light source may include not only an alternating current (AC) light source, but also any type of light source that repeatedly turns on and off.

According to an embodiment, the illuminance sensor 580 may include one photodiode and a plurality of modulators connected to the one photodiode and set with different integration times.

According to an embodiment, the illuminance sensor 580 (e.g., the illuminance sensor 320 of FIG. 3A) may measure the amount of light (or brightness) of the ambient light source, and the illuminance sensor 580 may be an ambient light sensor (ALS). For example, the illuminance sensor 580 (e.g., the illuminance sensor 320) may measure the illuminance of the surroundings of the electronic device (e.g., the magnitude of the ambient brightness detected by the illuminance sensor (unit: lux)) during the integration time. The integration time may refer to the period of time when the illuminance sensor is activated (or turned on) for illuminance sensing, the period of time when the illuminance sensor is exposed to ambient light, or the illuminance measurement time period when the illuminance sensor measures the ambient light.

According to an embodiment, the illuminance sensor 580 (e.g., the illuminance sensor 320 of FIGS. 3A and 3B) may be disposed below at least a partial area of the display 560.

According to an embodiment, the illuminance sensor 580 may measure illuminance (or ambient brightness) in the display-off time (or display-off period) and, based thereupon, use it to adjust the brightness of the display 560.

According to an embodiment, the display-off time may refer to a time period in which the illuminance sensor 580 is not affected by the brightness of the display 560 when sensing the illuminance. For example, the display-off time may be used to control timing to reduce the influence on the illuminance measurement due to the content displayed by the display 560.

According to an embodiment, a first modulator and a second modulator may be connected to one photodiode included in the illuminance sensor 580. The first modulator may be used in the obtaining of an electrical signal for a first illuminance value from the photodiode during a first integration time which is an activation time of the illuminance sensor, and the second modulator may be used in the obtaining of an electrical signal for a second illuminance value from the photodiode during a second integration time which is an activation time of the illuminance sensor.

According to an embodiment, the processor 520 or the sensor hub may obtain first illuminance values and second illuminance values based on the electrical signals received by the first and second modulators, respectively.

According to an embodiment, the modulators may be electrically connected to the photodiode and configured to control the times when the illuminance sensor is activated for illuminance measurement (e.g., integration time) or the times when it is exposed to ambient light.

According to an embodiment, the first modulator may obtain the electrical signal for the first illuminance value from the photodiode as the first integration time is adjusted according to the brightness of the display, e.g., the display-on time.

According to an embodiment, the second modulator may obtain the electrical signal for the second illuminance value from the photodiode while maintaining the second integration time as a pre-designated time period.

According to an embodiment, the second modulator may be configured as a modulator for determining a flickering light source.

According to an embodiment, the second modulator may determine various types of flickering light sources, such as devices using alternating current (AC) light sources (e.g. TV or monitor), devices using direct current (DC) light sources (e.g. smartphones or tablet PCs), etc. Thus, all types of light sources which repeatedly turns on/off, as well as AC light sources, may be determined as flickering light sources.

According to an embodiment, the second integration time of the second modulator may be set to a fixed time period shorter than the display-off time period of the duty cycle of the display. For example, the second integration time may be shorter than the first integration time.

According to an embodiment, the processor 520 (e.g., the processor 120 of FIG. 1) may set the first integration time of the first modulator and the second integration time of the second modulator of the illuminance sensor 580.

According to an embodiment, the processor 520 may adjust the first integration time of the first modulator of the illuminance sensor 580 according to the brightness of the display, e.g., display-on time.

According to an embodiment, the processor 520 may identify the display-off time period of the duty cycle of the display and may set the second integration time of the second modulator to be a designated time period shorter than the display-off time period.

According to an embodiment, the processor 520 (e.g., the processor 120 of FIG. 1) may determine whether the ambient light source is a flickering light source based on the second illuminance values calculated based on the electrical signal received from the second modulator of the illuminance sensor 580.

According to an embodiment, the processor 520 may determine that the ambient light source is the flickering light source when the second illuminance values calculated based on the electrical signal obtained from the second modulator meet a first condition and a second condition or meet either the first condition or the second condition.

According to an embodiment, the processor 520 may set a number of samples corresponding to the duty cycle (or display-off time period) of the display 560. The processor 520 may detect maximum value(s) (moving max value, discussed in detail below) in the second illuminance values obtained from the second modulator, where the number of second illuminance values correspond to the number of samples. Alternatively, the number of second illuminance values may correspond to a sliding window the size of which corresponds to the duty cycle of the display 560. If a difference between the detected maximum values is detected, the processor 520 may determine that the first condition is met. Meeting the first condition may indicate that a flickering light source and the light source of the display 560 both exist. For example, the difference between the detected maximum values may correspond to the amplitude of the flickering light source.

If the detected maximum values are substantially the same so that the difference is not detected or is below a certain threshold, the processor 520 may determine that the first condition is not met, indicating that the light source of the display 560 exists but there is no ambient flickering light source. For example, the detected maximum values may be the same or similar to the amplitude of the light source of the display 560. The difference between the detected maximum values may converge to 0 and may not be detected.

According to an embodiment, in a case where the duty cycle of the display 560 is the same although the frequency of the display differs when the display refresh rate is changed, the processor 520 may detect the maximum value(s) (max moving value) using the same number of samples for the various display refresh rates. For example, when the frequency of the display is 30 Hz, 60 Hz, and 120 Hz, the same duty cycle of display 560 may be had.

According to another embodiment, if the duty cycle of the display 560 differs according to the changes in the display refresh rate, the processor 520 may change the number of samples corresponding to the duty cycle of the display 560 by using Equation 1 and detect the maximum value(s) (max moving value).

$$\text{int(display-off time/second integration time)}+2 \qquad \text{[Equation 1]}$$

For example, when the second integration time of the second modulator is 400 us, and the frequency of the display is 240 Hz, and the display-off time is 660 us, the processor 520 may calculate "int(660/400)+2=3" based on Equation 1 and set the number of samples to 3, and detect the maximum value(s) (moving max). If the frequency of the display is 120 Hz and the display-off time is changed to 1330 us, the processor 520 may calculate "int(1330/400)+2=5," set the number of samples to 5, and calculate the maximum value(s) (moving max).

According to an embodiment, the processor 520 may receive display refresh rate (or scan rate) information in real-time from the display 560 or receive a Display Vsync signal indicating the display refresh rate information through a sensor hub included in, or separately configured from, the processor 520. The sensor hub (not shown) may control the overall operation of sensors (at least one sensor module including an illuminance sensor).

According to an embodiment, the sensor hub (not shown) may control at least some of operations related to the illuminance sensor. The sensor hub may be associated with the processor 520. The sensor hub may include a supplementary processor. The sensor hub may operate in low power.

According to an embodiment, the processor 520 may delete second illuminance value detected in the display-off time interval in the second illuminance values calculated based on the electrical signal obtained from the second modulator, calculate a standard deviation for the second illuminance values in the display-on time interval and, if the calculated standard deviation differs from a threshold, determine that the second condition is met. Meeting the second condition may indicate that a flickering light source and the light source of the display 560 both exist. When the calculated standard deviation value is equal to the threshold, the processor 520 may determine that the second condition is not met. Failure to meet the second condition may indicate that the light source of the display 560 exists but there is no ambient flickering light source. The threshold may be a standard deviation corresponding to when the light source of the display 560 is present without a flashing light source.

According to an embodiment, when the processor 520 determines that the ambient light source is a flickering light source, the processor 520 may adjust the brightness of the display using the first illuminance values calculated based on the signal received from the first modulator or the second illuminance values calculated based on the signal received from the second modulator.

According to an embodiment, the processor 520 may determine that the ambient light source is a flickering light source based on the second illuminance values and, after obtaining display parameter information, may compensate for the first illuminance values with a compensation value for compensating for the display parameter information and adjust the brightness (or luminance) of the display based on the compensated first illuminance value (e.g., lux value). According to an embodiment, the display parameter information may include color on pixel ratio (COPR) information associated with the image output through the display 560, and the display parameter information may be related to at least one pixel of the display 560. The COPR information may be a ratio of the R, G, and B values of the image output from the display 560. Since the display influence is increased according to the illuminance values if the display-on time interval increases when the display 560 is bright, the processor 520 may compensate the first illuminance values with a compensation value for compensating for the display parameter information considering the display parameter information (e.g., COPR information). The compensation value for compensating for the display parameter information (e.g., COPR information) may predetermined based on the display parameter information, and generally known compensation method may be used as method of compensating the first illuminance values with a compensation value for compensating for the display parameter information. According to an embodiment, the processor 520 may determine that the ambient light source is a flickering light source and, if failing to obtain the display parameter information (e.g., COPR information), adjust the brightness of the display based on the second illuminance values. The processor 520 may calculate the average value for the second illuminance values and determine an illuminance value corresponding to the calculated average value as the illuminance value used to adjust the display brightness value (or illuminance).

According to an embodiment, if the processor 520 does not determine that the ambient light source is a flickering light source, the processor 520 may adjust the brightness of the display 560 using the first illuminance values calculated based on the electrical signal obtained from the first modulator connected to the illuminance sensor.

According to an embodiment, if the processor 520 does not determine that the ambient light source is a flickering light source, the processor 520 may determine that the smallest illuminance value (min) among the plurality of first illuminance values is the illuminance value capable of adjusting the brightness of the display 560.

According to an embodiment, the processor 520 does not determine that the ambient light source is a flickering light source and, if obtaining the display parameter information, e.g., the color on pixel ratio (COPR) associated with the image output from the display 560, may compensate for the first illuminance values with a compensation value that takes into account the display parameter information and adjust the brightness of the display based on the compensated first illuminance values (e.g., lux values).

According to an embodiment, the memory 530 may be implemented to be substantially the same or similar to the memory 130 of FIG. 1.

According to an embodiment, the memory 530 may store the first illuminance values calculated based on the electrical signal obtained through the first modulator during the first integration time and the second illuminance value calculated based on the electrical signal obtained through the second modulator.

According to an embodiment, the display 560 may be implemented in substantially the same or similar manner to the display module 160 of FIG. 1.

Figure 6A:
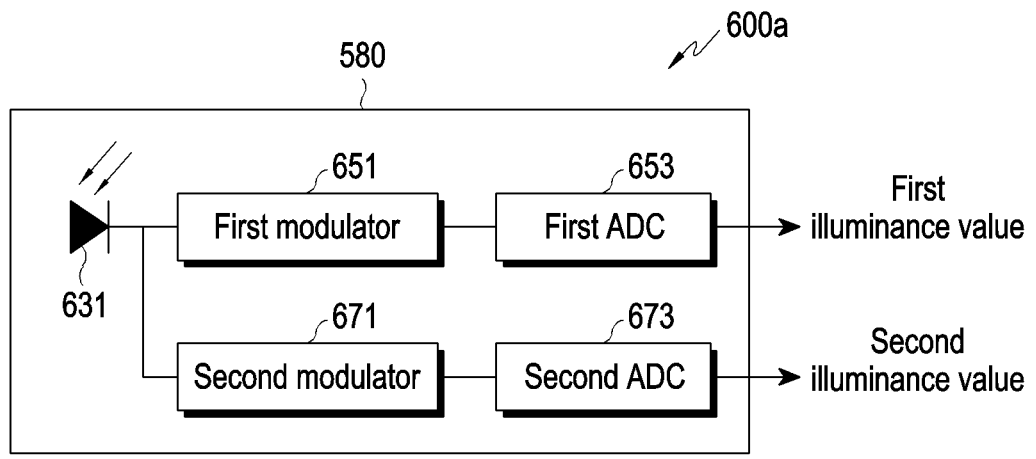
FIG. 6A is a block diagram illustrating an illuminance sensor according to an embodiment.

FIG. 6A is a block diagram 600a illustrating an illuminance sensor according to an embodiment.

Although the embodiment of FIG. 6A is showing an illuminance sensor including one photodiode and two modulators connected to the one photodiode, the instant disclosure is not so limited. For example, the instant disclosure may also include an illuminance sensor that includes a plurality of photodiodes and two modulators connected to each of the plurality of photodiodes.

Referring to FIG. 6A, an illuminance sensor 580 (e.g., the illuminance sensor 320 of FIGS. 3A and 3B) may include a photodiode (PD) 631, a first modulator 651, a first ADC 653, a second modulator 671, and a second ADC 673.

According to an embodiment, the illuminance sensor 580 (e.g., the illuminance sensor 320 of FIGS. 3A and 3B) may be disposed under at least a partial area of a display (e.g., the display 560 of FIG. 5) to measure the amount (or brightness) of incident ambient light.

According to an embodiment, the photodiode (PD) 631 may convert the light energy received from the light source near the electronic device into electrical energy.

According to an embodiment, the first modulator 651 may obtain the electrical signal for the first illuminance value received from the photodiode (PD) 631 during the first integration time.

According to an embodiment, the first integration time may be adjusted according to the brightness of the display, e.g., the display-on time period.

According to an embodiment, the first modulator 651 may operate substantially simultaneously with the second modulator 671 while independently obtaining the electrical signal for the first illuminance value.

According to an embodiment, the first ADC 653 may convert the electrical signal for the first illuminance value received from the first modulator 651 into a digital signal or values. The processor (e.g., the processor 520 of FIG. 5) or a sensor hub (not shown) may calculate the first illuminance value based on the converted digital values.

According to an embodiment, the second modulator 671 may obtain the electrical signal for the second illuminance value received from the photodiode (PD) 631 during the second integration time.

According to an embodiment, the second integration time of the second modulator 671 may be set to a designated time period shorter than the display-off time period of the duty cycle of the display.

According to an embodiment, the second modulator 671 may operate substantially simultaneously with the first modulator 651 while independently obtaining the electrical signal for the second illuminance value.

According to an embodiment, the second ADC 673 may convert the electrical signal for the second illuminance value received from the second modulator 671 into digital values. The processor (e.g., the processor 520 of FIG. 5) or the sensor hub (not shown) may calculate the second illuminance value based on the converted digital values.

In an embodiment, the first modulator 651 may be integrated with the first ADC 653. For example, the first modulator 651 may convert the light (light source) energy received from the photodiode 631 into digital values, and the processor or the sensor hub may output the first illuminance values based on the converted digital values.

In an embodiment, the second modulator 671 may be integrated with the second ADC 673. For example, the second modulator 671 may convert the light (light source) energy received from the photodiode 631 into digital values, and the processor or sensor hub may output the second illuminance values based on the converted digital values.

According to an embodiment, the first ADC 653 and the second ADC 673 may be provided as a single ADC or as a plurality of individual ADCs capable of receiving the R value, G value, B value, and C value as shown in FIG. 4B.

Figure 6B:
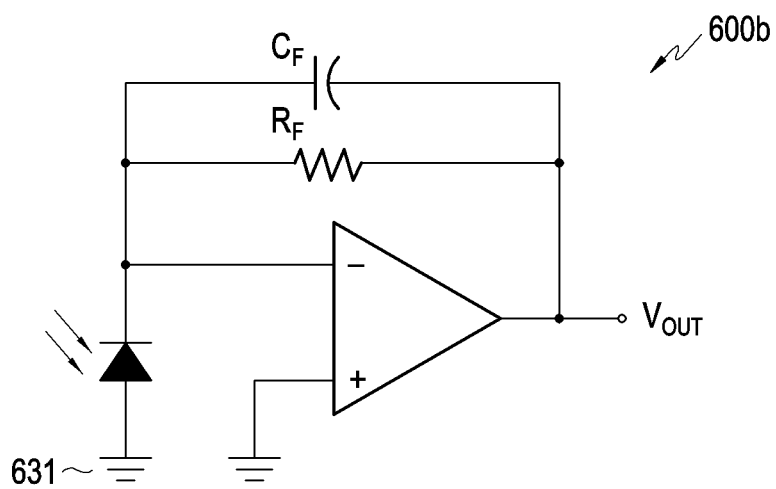
FIG. 6B is a circuit diagram illustrating a driving operation of a modulator according to an embodiment.

FIG. 6B is a circuit diagram 600b illustrating a driving operation of a modulator according to an embodiment.

Referring to FIG. 6B, a modulator (e.g., the first modulator 651 of FIG. 6A and/or the second modulator 671) may be driven in an operation in which if an electrical signal is obtained from the photodiode 631, capacitor $C_F$ is electrically charged so that the voltage value increases and, if the voltage reaches a designated voltage level, the ADC value is increased by "1" and reset, and it is discharged by resistor $R_F$ and is charged again. The charging and discharging cycle, i.e., pulse rate, of the modulator (e.g., the first modulator 651 and/or the second modulator 671 of FIG. 6A) may be determined based on the $C_F$ value and the $R_F$ value, the $V_{out}$ value may be correspondingly determined, and the determined $V_{out}$ value may be transferred to the processor (e.g., the processor 520 of FIG. 5) through the ADC (e.g., the first ADC 653 or second ADC 673 of FIG. 6A). The modulator (e.g., the first modulator 651 and/or the second modulator 671 of FIG. 6A) may control the time period during which the photodiode 631 may receive light. As the charging and discharging times decrease, the amount of data (or the number of samples) output per unit time may increase.

Figure 7A:
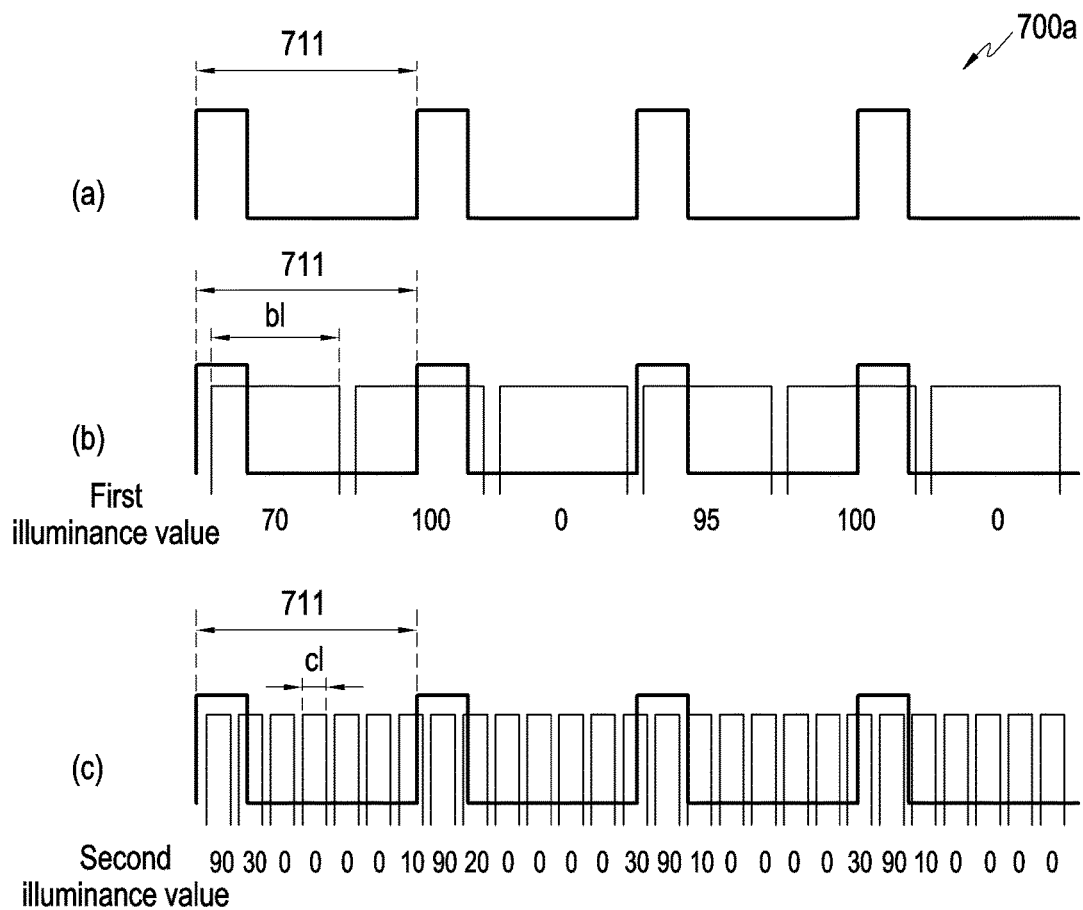
FIGS. 7A and 7B are views illustrating illuminance values measured according to a light source of a display in an electronic device according to an embodiment.
Figure 7B:
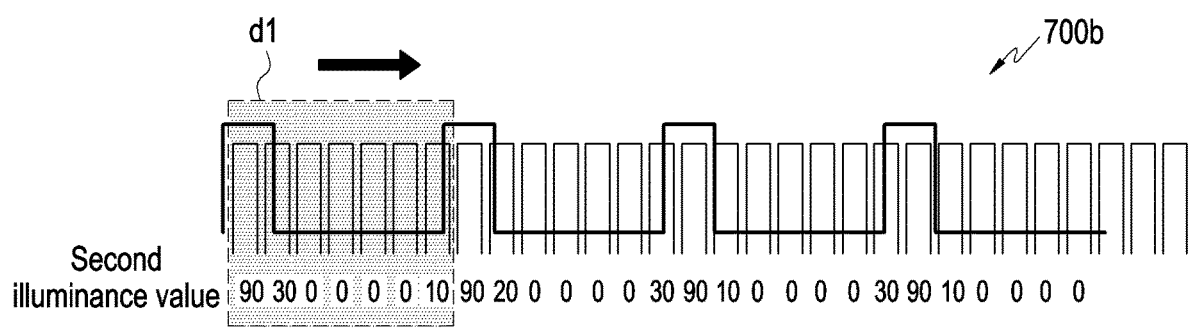

FIGS. 7A and 7B are views 700a and 700b illustrating illuminance values measured according to a light source of a display in an electronic device according to an embodiment.

According to an embodiment, the duty cycle 711 of the display shown in FIGS. 7A and 7B may indicate an on time and an off time of the display 301.

Referring to FIG. 7A, (a) shows the duty cycle 711 of the display, (b) shows first illuminance values (unit: lux) obtained during a first integration time b1 of a first modulator (e.g., the first modulator 651 of FIG. 6A), and (c) shows second illuminance values (unit: lux) obtained during a second integration time c1 of a second modulator (e.g., the second modulator 671 of FIG. 6A).

Referring to FIG. 7B, the electronic device (e.g., the electronic device 501 of FIG. 5) may set the number of samples d1 corresponding to the duty cycle of the display to, e.g., 7, to identify whether the second illuminance values calculated based on the electrical signal obtained from the second modulator meet the first condition. Different sets of second illuminance values corresponding to the number of samples d1 are analyzed. For example, the first set is samples 1-7, the second set is samples 2-8, etc. When detecting the maximum value (max moving value) from each set of the second illuminance values, "90, 30, 0, 0, 0, 0, 10", "30, 0, 0, 0, 0, 10, 90", "0, 0, 0, 0, 10, 90, 20", "0, 0, 0, 10, 90, 20, 0", etc. in the example shown in FIG. 7A, the electronic device may identify that the detected maximum values all are the same value "90 lux" as shown in Table 1 below. If identifying that the detected maximum values all are the same value "90 lux," the electronic device may identify that the difference between the detected maximum values converges to 0 and therefore the difference is not detected. If identifying that the difference between the detected maximum values is not detected, the electronic device may determine that the first condition is not met and determine that the ambient light source is not a flickering light source.

TABLE 1

| | Standard deviation | Raw data | | | | | | | | | | | | | |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| First illuminance value | 48.42 | 70 | 100 | 10 | 105 | 100 | 0 | | | | | | | | |
| Maximum value (moving max) | Difference: 0 | 100 | 100 | 100 | 100 | | | | | | | | | | |

TABLE 1-continued

| | | | | | | | | | | | | | | | | |
|---|---|---|---|---|---|---|---|---|---|---|---|---|---|---|---|---|
| Second illuminance value | 31.95 | 90 | 30 | 0 | 0 | 0 | 0 | 10 | 90 | 20 | 0 | 0 | 0 | 0 | 0 | 30 |
| Maximum value (moving max) | Difference: 0 | 90 | 90 | 90 | 90 | 90 | 90 | 90 | 90 | 90 | 90 | 90 | 90 | 90 | 90 | |

| | | Raw data | | | | | | | | | | | | Illuminance value |
|---|---|---|---|---|---|---|---|---|---|---|---|---|---|---|
| | | 15 | 16 | 17 | 18 | 19 | 20 | 21 | 22 | 23 | 24 | 25 | 26 | 27 | |
| First illuminance value | | | | | | | | | | | | | | | 0 |
| Maximum value (moving max) | | | | | | | | | | | | | | | 0 |
| Second illuminance value | | 90 | 10 | 0 | 0 | 0 | 0 | 30 | 90 | 10 | 0 | 0 | 0 | 0 | 0 |
| Maximum value (moving max) | | 90 | 90 | 90 | 90 | 90 | 90 | 90 | | | | | | | |

As shown in Table 1 above, the electronic device may set the number of samples d1 corresponding to the duty cycle of the display based on the second illuminance values as shown in (c) of FIG. 7A, detect the maximum values from each set (e.g., 7) of samples, and if the detected maximum values are all the same value "90 lux," and thus detects the difference as "0," determine that the first condition is not met and that the ambient light source is not a flickering light source.

Further, when the electronic device identifies that the first condition is not met, "0 lux" which is the smallest illuminance value (min) among the first illuminance values obtained during the first integration time of the first modulator may be used as the illuminance value used to adjust the brightness of the display.

Figure 8A:
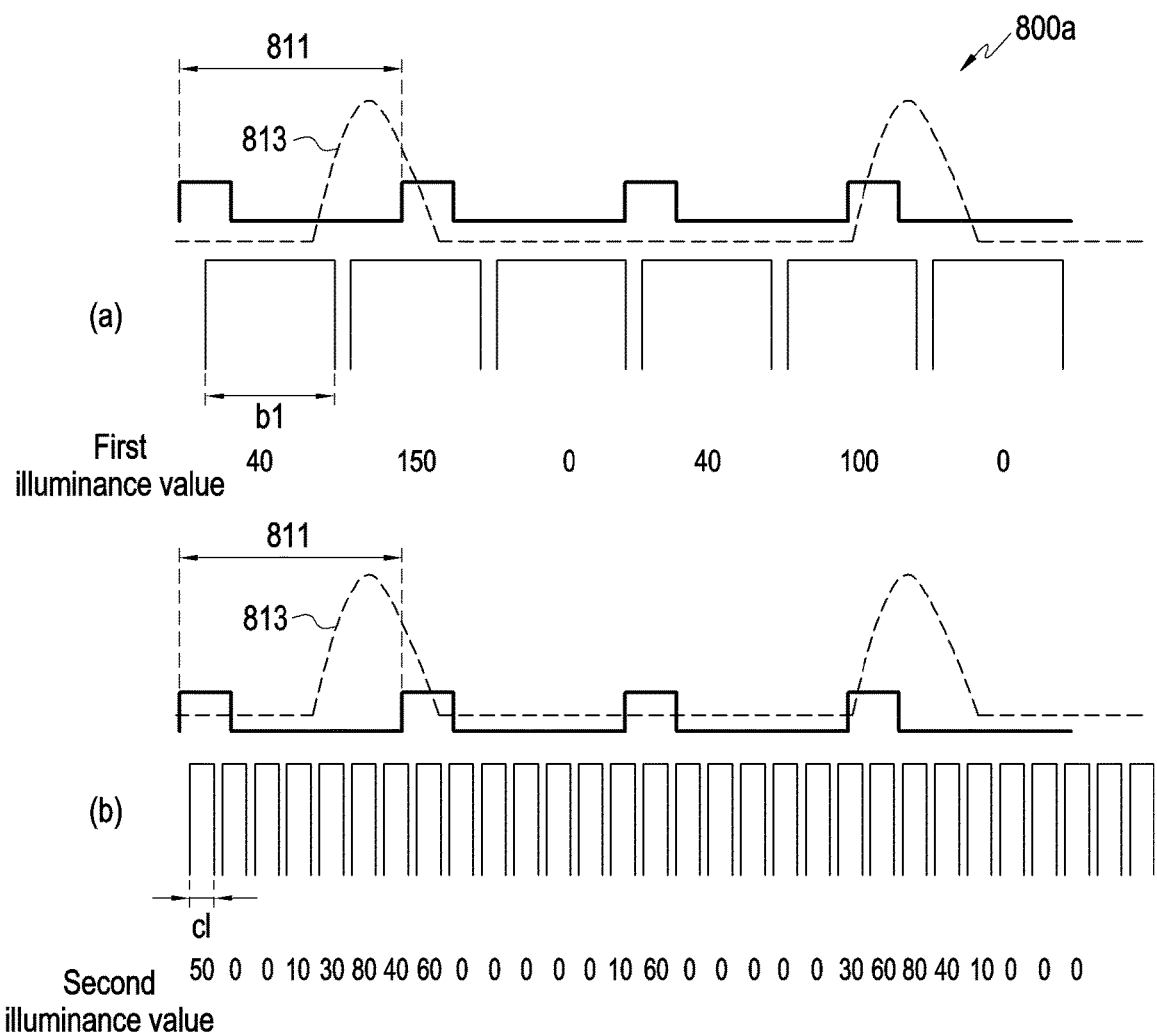
FIGS. 8A and 8B are views illustrating illuminance values measured according to a light source of a display and a flickering light source in an electronic device according to an embodiment.
Figure 8B:
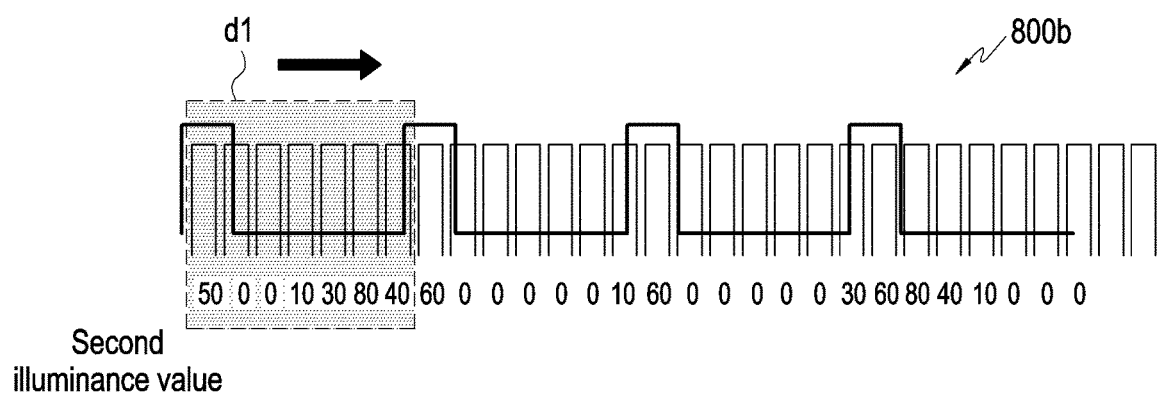

FIGS. 8A and 8B are views 800a and 800b illustrating illuminance values measured according to a light source of a display and a flickering light source in an electronic device according to an embodiment.

According to an embodiment, the duty cycle 811 of the display shown in FIGS. 8A and 8B may indicate an on time and an off time of the display 301.

Referring to FIG. 8A, (a) shows first illuminance values obtained during a first integration time b1 of a first modulator (e.g., the first modulator 651 of FIG. 6A) while the duty cycle 811 of the display and luminance from the flickering light source 813 are both shown, and (b) shows second illuminance values obtained during a second integration time c1 of a second modulator (e.g., the second modulator 671 of FIG. 6A) while the duty cycle 811 of the display and luminance from the flickering light source 813 are both shown.

Referring to FIG. 8B, the electronic device (e.g., the electronic device 501 of FIG. 5) may set the number of samples d1 corresponding to the duty cycle of the display to, e.g., 7, to identify whether the second illuminance values calculated based on the electrical signal received from the second modulator meet the first condition.

When detecting the maximum value (max moving) from each set of the second illuminance values "50, 0, 0, 10, 30, 80, 40", "0, 0, 10, 30, 80, 40, 60", "0, 10, 30, 80, 40, 60, 0", "10, 30, 80, 40, 60, 0, 0", etc. in the example shown in FIG. 8A, the electronic device may identify that the detected maximum values are "80 lux" and "60 lux" as shown in Table 2 below. If the detected maximum values, "80 lux" and "60 lux," are not the same and the difference, "20 lux," is detected between "80 lux" and "60 lux," the electronic device may determine the first condition is met and that the ambient light source is a flickering light source.

TABLE 2

| | Standard deviation | Raw data | | | | | | | | | | | | | |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| First illuminance value | 53.17 | 40 | 150 | 0 | 40 | 150 | 50 | | | | | | | | |
| Maximum value (moving max) | Difference: 50 | 150 | 150 | 150 | 100 | 100 | | | | | | | | | |
| Second illuminance value | 27.1 | 50 | 0 | 0 | 10 | 30 | 80 | 40 | 60 | 0 | 0 | 0 | 0 | 0 | 10 |
| Maximum value (moving max) | Difference: 20 | 80 | 80 | 80 | 80 | 80 | 80 | 60 | 60 | 60 | 60 | 60 | 60 | 60 | 60 |

TABLE 2-continued

| | Raw data | | | | | | | | | | | | | Illuminance value |
|---|---|---|---|---|---|---|---|---|---|---|---|---|---|---|
| | 15 | 16 | 17 | 18 | 19 | 20 | 21 | 22 | 23 | 24 | 25 | 26 | 27 | |
| First illuminance value | | | | | | | | | | | | | | 0 |
| Maximum value (moving max) | | | | | | | | | | | | | | 40 |
| Second illuminance value | 60 | 0 | 0 | 0 | 0 | 0 | 30 | 60 | 80 | 40 | 10 | 0 | 0 | 0 |
| Maximum value (moving max) | 60 | 60 | 80 | 80 | 80 | 50 | 50 | | | | | | | 40 |

As shown in Table 2 above, the electronic device may set the number of samples d1 corresponding to the duty cycle of the display and analyze the second illuminance values as shown in (b) of FIG. 8A, detect the maximum values from each set (e.g., 7) of samples, and if detecting that the difference between the detected maximum values is "20 lux," determine that the first condition is met and that the ambient light source is a flickering light source.

If detecting the difference between the maximum values as shown in Table 2 above, the electronic device may output the illuminance value (e.g., "40 lux") that takes into account the flickering light source. The illuminance value may be determined by adding a constant set according to the integration time, to the result of subtracting the smallest value (min) from the highest value (max) in the maximum values.

Further, to be able to adjust the brightness of the display while taking into account the illuminance values generated by the flickering light source when the first condition is met, the electronic device may calculate the average value of the second illuminance values and adjust the brightness value of the display based on the calculated average value.

If the number of samples d1 is set to correspond to the duty cycle of the display as shown in FIGS. 7A and 7B and FIGS. 8A and 8B, the interval during which the display is off is included, and the illuminance value when the display is on is maintained as constant, so that a fine change in the flickering light source may be detected while removing the display light source value.

Figure 9A:
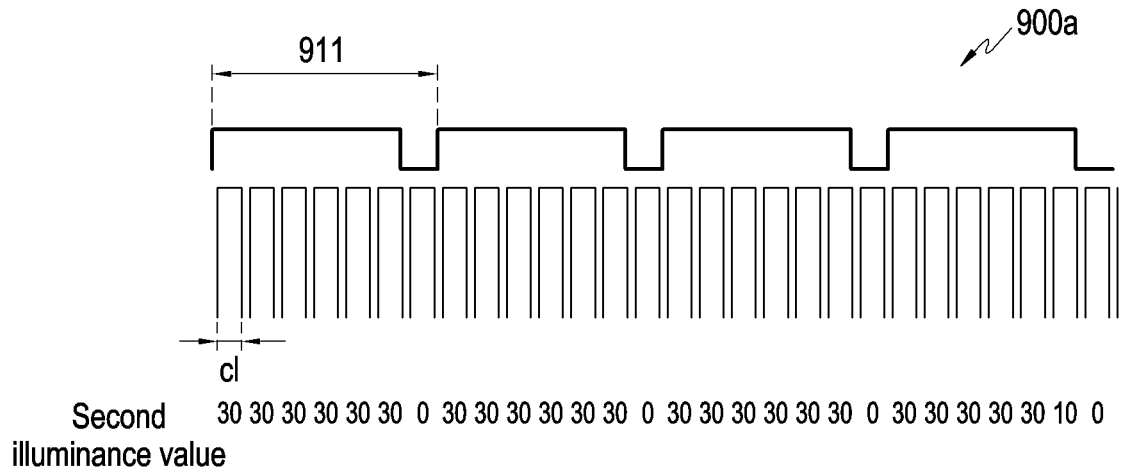
FIG. 9A is a view illustrating illuminance values measured according to a light source of a display in an electronic device according to an embodiment.
Figure 9B:
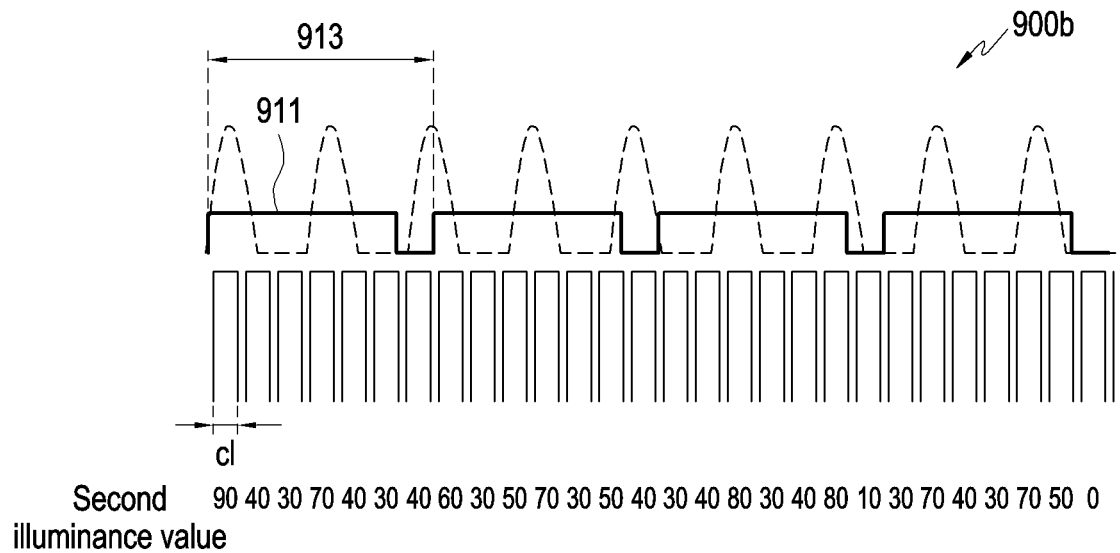
FIG. 9B is a view illustrating illuminance values measured according to a light source of a display and a flickering light source in an electronic device according to an embodiment.

FIG. 9A is a view 900a illustrating illuminance values measured according to a light source of a display in an electronic device according to an embodiment. FIG. 9B is a view 900b illustrating illuminance values measured according to a light source of a display and a flickering light source in an electronic device according to an embodiment.

According to an embodiment, the duty cycle 911 of the display shown in FIGS. 9A and 9B may indicate an on time and an off time of the display 301.

FIG. 9A shows second illuminance values obtained during a second integration time c1 of a second modulator (e.g., the second modulator 671 of FIG. 6A) during the duty cycle 911 of a display that is not near a flickering light source.

To identify whether the second illuminance values obtained from the second modulator meet the second condition, the electronic device (e.g., the electronic device 501 of FIG. 5) may calculate the standard deviation for the illuminance values for the display-on interval, when the illuminance values for the display-off time interval in the second illuminance values in FIG. 9A are removed, as shown in Table 3.

TABLE 3

| | Standard deviation | Raw data | | | | | | | | | | | | | |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| Second illuminance value | 10.76 | 30 | 30 | 30 | 30 | 30 | 30 | 0 | 30 | 30 | 30 | 30 | 30 | 30 | 0 |
| Maximum value (moving max) | Difference: 0 | 30 | 30 | 30 | 30 | 30 | 30 | 30 | 30 | 30 | 30 | 30 | 30 | 30 | 30 |
| Standard deviation | 0.00 | 30 | 30 | 30 | 30 | 30 | 30 | min | 30 | 30 | 30 | 30 | 30 | 30 | min |

| | | Raw data | | | | | | | | | | | | | |
|---|---|---|---|---|---|---|---|---|---|---|---|---|---|---|---|
| | | 15 | 16 | 17 | 18 | 19 | 20 | 21 | 22 | 23 | 24 | 25 | 26 | 27 | 28 |
| Second illuminance value | | 30 | 30 | 30 | 30 | 30 | 30 | 0 | 30 | 30 | 30 | 30 | 30 | 10 | 0 |
| Maximum value (moving max) | | 30 | 30 | 30 | 30 | 30 | 30 | 30 | 30 | | | | | | |
| Standard deviation | | 30 | 30 | 30 | 30 | 30 | 30 | min | 30 | 30 | 30 | 30 | 30 | 10 | min |

As shown in Table 3, if the standard deviation (e.g., 0.00) for the illuminance values for the display-on interval, in which the illuminance value (min) for the display-off interval is removed from the second illuminance values in FIG. 9A, is the same as a threshold (e.g., 0.00), the electronic device may determine that the second condition is not met and that the ambient light source is not a flickering light source.

Further, when the electronic device identifies that as the second condition is not met, "0 lux" which is the smallest illuminance value (min) in the first illuminance values obtained during the first integration time of the first modulator may be used to adjust the brightness of the display.

FIG. 9B shows second illuminance values obtained during a second integration time c1 of a second modulator (e.g., the second modulator 671 of FIG. 6A) while the duty cycle 911 of the display and the duty cycle of the flickering light source 913 are combined. To identify whether the second illuminance values obtained from the second modulator meet the second condition, the electronic device (e.g., the electronic device 501 of FIG. 5) may calculate a standard deviation for illuminance values for the display-on interval, and in doing so remove the illuminance values for the display-off interval from the second illuminance values in FIG. 9B, as shown in Table 4.

According to an embodiment, an electronic device (e.g., the electronic device 501 of FIG. 5) may comprise a housing (e.g., the housing 310 of FIG. 3A) including a front surface (e.g., the front surface 310A of FIG. 3A) and a rear surface (e.g., the rear surface 310B of FIG. 3A) facing in a direction opposite to the front surface, a display (e.g., the display 301 of FIG. 3) included in the housing and visually exposed through a portion of the front surface, an illuminance sensor (e.g., the illuminance sensor 320 of FIGS. 3A and 3B) including a first modulator (e.g., the first modulator 651 of FIG. 6A) obtaining a first signal for first illuminance values during a first integration time and a second modulator (e.g., the second modulator 671 of FIG. 6A) obtaining a second signal for second illuminances value during a second integration time and disposed between the display and the rear surface to overlap an area of the display when viewed from above the front surface, the first modulator and the second modulator operating at least partially simultaneously, and a processor (e.g., the processor 520 of FIG. 5) positioned in the housing and operatively connected with the display. The processor may be configured to calculate the first illuminance values based on the first signal obtained through the first modulator, calculate the second illuminance values based on the second signal obtained through the second modulator, determine that an ambient light source is a

TABLE 4

| | Standard deviation | Raw data | | | | | | | | | | | | | |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| Second illuminance value | 20.82 | 90 | 40 | 30 | 70 | 40 | 30 | 40 | 60 | 30 | 50 | 90 | 30 | 50 | 40 |
| Maximum value (moving max) | Difference: 0 | 90 | 90 | 90 | 90 | 90 | 90 | 90 | 90 | 90 | 90 | 90 | 90 | 90 | 90 |
| Standard deviation | 19.56 | 90 | 40 | 30 | 70 | 40 | min | 40 | 60 | 30 | 50 | 90 | 30 | 50 | 40 |

| | Raw data | | | | | | | | | | | | | |
|---|---|---|---|---|---|---|---|---|---|---|---|---|---|---|
| | 15 | 16 | 17 | 18 | 19 | 20 | 21 | 22 | 23 | 24 | 25 | 26 | 27 | 28 |
| Second illuminance value | 30 | 40 | 90 | 30 | 40 | 80 | 10 | 30 | 70 | 40 | 30 | 70 | 50 | 0 |
| Maximum value (moving max) | 90 | 90 | 90 | 90 | 90 | 90 | 90 | 90 | | | | | | |
| Standard deviation | min | 40 | 90 | 30 | 40 | 80 | min | 30 | 70 | 40 | 30 | 70 | 50 | min |

As shown in Table 4, if the standard deviation (e.g., 19.55) for the illuminance values for the display-on interval, in which the illuminance value (min) for the display-off interval is removed from the second illuminance values in FIG. 9B, is not identical to the threshold (e.g., 0.00), the electronic device may determine that the second condition is met and that the ambient light source is a flickering light source.

Further, to adjust the brightness of the display using all the illuminance values when the second condition is met, the electronic device may calculate the average value of the second illuminance values and adjust the brightness value of the display based on the calculated average value.

The operation of determining that the ambient light source is a flickering light source using the standard deviation for the illuminance values for the display-on interval in the second illuminance values may detect a flickering light source having a frequency higher than the frequency of the display.

flickering light source based on the second illuminance values, if obtaining display parameter information associated with an image output through the display, compensate for the first illuminance values based on the display parameter information and adjust a brightness value of the display based on the compensated first illuminance values, and if failing to obtain the display parameter information, adjust the brightness value of the display based on the second illuminance values.

According to an embodiment, the processor may adjust brightness of the display based on the first illuminance values if the processor determines that the ambient light source is not the flickering light source based on the second illuminance values.

According to an embodiment, the illuminance sensor may include a photodiode. The first modulator and the second modulator may be connected to the photodiode.

According to an embodiment, the processor may be configured to calculate the first illuminance values while adjusting the first integration time of the first modulator according to a display-on time period of the display.

According to an embodiment, the processor may be configured to calculate the second illuminance values while maintaining the second integration time of the second modulator.

According to an embodiment, the second integration time of the second modulator may be set to be shorter than a display-off time period of the display.

According to an embodiment, the processor may be configured to determine that the ambient light source is the flickering light source if a first condition and a second condition are met based on the second illuminance values.

According to an embodiment, the processor may be configured to set a sampling number corresponding to a duty cycle of the display, detect maximum illuminance values in sets of the second illuminance values corresponding to the sampling number, and if detecting a difference between the detected maximum illuminance values, determine that the first condition is met.

According to an embodiment, the processor may be configured to calculate a standard deviation for sets of second illuminance values corresponding to a display-on interval of the display, and if the calculated standard deviation differs from a threshold, determine that the second condition is met.

According to an embodiment, the processor may be configured to, if determining that the ambient light source is the flickering light source, calculate an average value for the second illuminance values and adjust the brightness value of the display based on the calculated average value.

Figure 10:
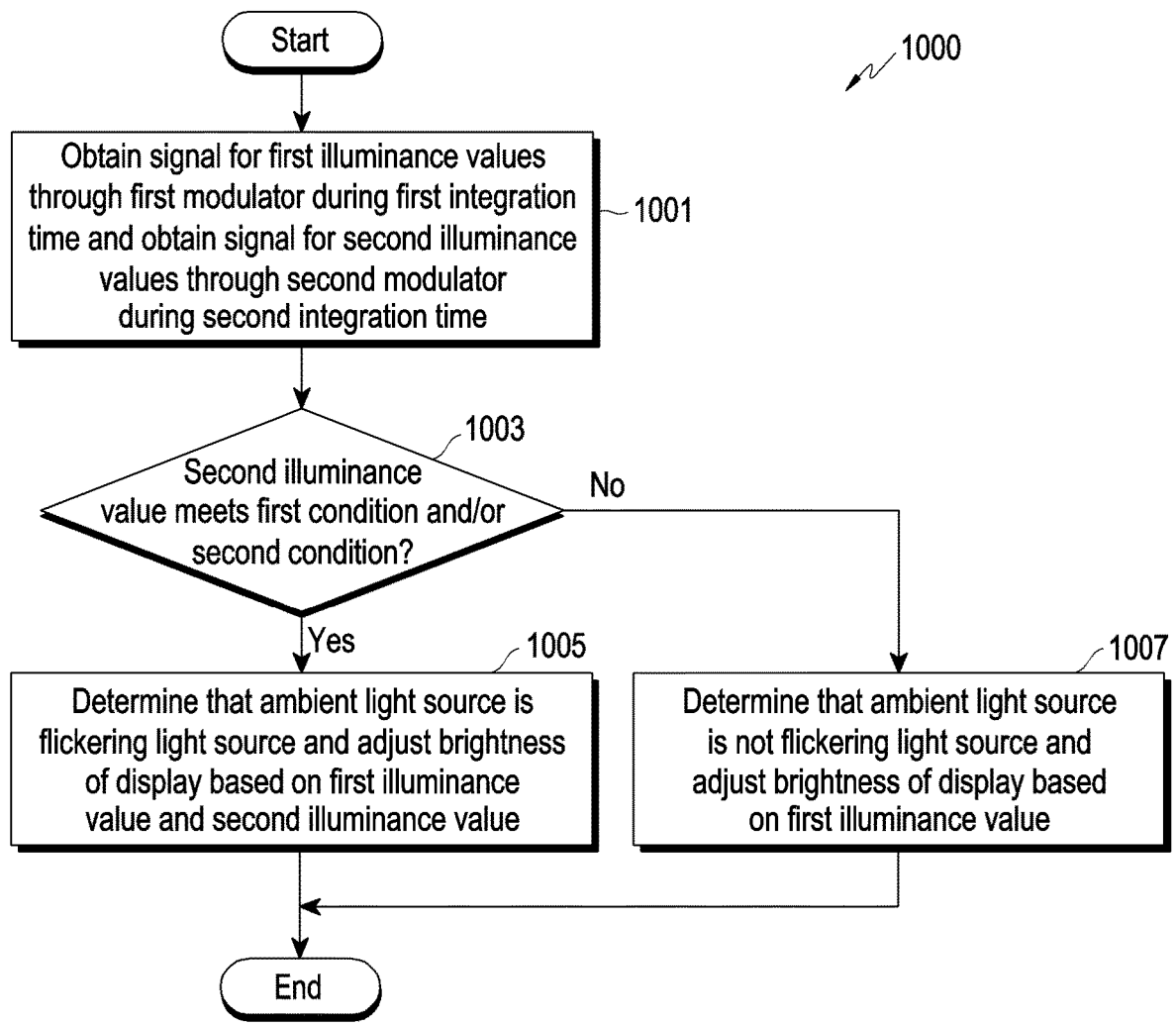
FIG. 10 is a flowchart illustrating an operation of detecting a flickering light source in an electronic device according to an embodiment.

FIG. 10 is a flowchart 1000 illustrating an operation of detecting a flickering light source in an electronic device according to an embodiment. The flickering light source detection operations may include operations 1001 to 1007. According to an embodiment, at least one of operations 1001 to 1007 may be omitted or changed in order or may add other operations. The flickering light source detection operation may be performed by the electronic device 101 of FIG. 1, the processor 120 of FIG. 1, the electronic device 501 of FIG. 5, or the processor 520 of FIG. 5.

In operation 1001, the electronic device 501 may obtain a signal for a first illuminance value through a first modulator (e.g., the first modulator 651 of FIG. 6A) during a first integration time and obtain a signal for a second illuminance value through a second modulator (e.g., the second modulator 671 of FIG. 6A) during a second integration time.

According to an embodiment, the illuminance sensor disposed under at least a partial area of the display (e.g., the display 560 of FIG. 5) may include at least one photodiode and a first modulator and a second modulator individually connected to the at least one photodiode.

According to an embodiment, the first modulator may obtain an electrical signal for the first illuminance value from the photodiode as the first integration time is adjusted according to the brightness of the display, e.g., the display-on time.

According to an embodiment, the second modulator may obtain an electrical signal for the second illuminance value from the photodiode while always maintaining the second integration time, which may be a predetermined time period.

According to an embodiment, the second modulator may be configured as a modulator for determining the flickering light source.

According to an embodiment, the second integration time of the second modulator may be set to a designated time period shorter than the display-off time period of the duty cycle of the display.

In operation 1003, the electronic device 501 may identify whether the second illuminance values meet the first condition and/or the second condition.

According to an embodiment, the electronic device 501 may determine that the ambient light source is the flickering light source when the second illuminance values calculated based on the electrical signal obtained from the second modulator meet the first condition and the second condition or meet either the first condition or the second condition.

According to an embodiment, the electronic device 501 may set a number of samples corresponding to the duty cycle (e.g., from the display-on time to the display-off time) of the display (e.g., the display 560 of FIG. 5). The electronic device 501 may detect a maximum value (moving max value) in sets of the second illuminance values corresponding to the number of samples when obtaining the second illuminance values from the second modulator and, if a difference between the detected maximum values is detected, determine that the first condition is met. Meeting the first condition may indicate that a flickering light source and the light source of the display both exist. If the detected maximum values are the same so that the difference may not be detected, i.e. the difference is zero or close to zero, the electronic device 501 may determine that the first condition is not met, meaning the light source of the display exists but there is no surrounding flickering light source.

According to an embodiment, the electronic device 501 may delete second illuminance value in the display-off interval from the second illuminance values obtained from the second modulator, calculate a standard deviation for the second illuminance values in the display-on interval and, if the calculated standard deviation differs from a threshold, determine that the second condition is met. Meeting the second condition may indicate that a flickering light source and the light source of the display both exist. When the calculated standard deviation value is equal to the threshold, the electronic device may determine that the second condition is not met. Failure to meet the second condition may indicate that the light source of the display exists but there is no surrounding flickering light source. The threshold may indicate the standard deviation when the light source of the display is present without a surrounding flashing light source.

If the second illuminance values meet the first condition and/or the second condition in operation 1003, the electronic device 501 may determine that the ambient light source is a flickering light source and adjust the brightness of the display based on the first illuminance values or second illuminance values in operation 1005.

According to an embodiment, the electronic device may determine that, as the second illuminance values meet the first condition and/or the second condition, the ambient light source is a flickering light source and, if obtaining display parameter information (e.g., COPR information), compensate for the first illuminance values with a compensation value corresponding to the display parameter information and adjust the brightness of the display based on the compensated first illuminance values. The display parameter information may include COPR information about the image output through the display 560, as information related to at least one pixel of the display 560. The COPR information may be a ratio of the R, G, and B values of the image output from the display 560.

According to an embodiment, the electronic device may determine that, as the second illuminance values meet the first condition and/or the second condition, the ambient light source is a flickering light source and, if failing to obtain display parameter information (e.g., COPR information), to use all the illuminance values, the electronic device may calculate the average value for the second illuminance values and determine a illuminance value corresponding to the calculated average value to be used to adjust the brightness of the display.

If the second illuminance values do not meet the first condition and/or the second condition in operation 1003, the electronic device 501 may determine that the ambient light source is not a flickering light source and adjust the brightness of the display based on the first illuminance values in operation 1007.

According to an embodiment, a method for detecting a flickering light source surrounding an electronic device may comprise calculating first illuminance values based on a first signal obtained from a first modulator included in an illuminance sensor during a first integration time, calculating second illuminance values based on a second signal obtained from a second modulator included in the illuminance sensor during a second integration time, determining that an ambient light source is the flickering light source based on the second illuminance values, when obtaining display parameter information associated with an image output through a display of the electronic device, compensating for the first illuminance values based on the display parameter information and adjusting a brightness value of the display based on the compensated first illuminance values, and when failing to obtain the display parameter information, adjusting the brightness value of the display based on the second illuminance values. The first modulator and the second modulator may operate at least partially simultaneously.

According to an embodiment, the method may further comprise adjusting brightness of the display based on the first illuminance values when determining that the ambient light source is not the flickering light source based on the second illuminance values.

According to an embodiment, the illuminance sensor may be disposed under at least a partial area of the display.

According to an embodiment, the method may further comprise calculating the first illuminance values while adjusting the first integration time of the first modulator according to a display-on time period of the display.

According to an embodiment, the method may further comprise calculating the second illuminance values while maintaining the second integration time of the second modulator.

According to an embodiment, the second integration time of the second modulator may be set to be shorter than a display-off time period of the display.

According to an embodiment, the method may further comprise determining that the ambient light source is the flickering light source when a first condition and a second condition are met based on the second illuminance values.

According to an embodiment, the method may further comprise setting a sampling number corresponding to a duty cycle of the display, detecting maximum illuminance values in sets of the second illuminance values corresponding to the sampling number, and when detecting a difference between the detected maximum illuminance values, determining that the first condition is met.

According to an embodiment, the method may further comprise calculating a standard deviation for sets of the second illuminance values corresponding to a display-on interval of the display, and when the calculated standard deviation differs from a threshold, determining that the second condition is met.

According to an embodiment, the method may further comprise calculating an average value for the second illuminance values when determining that the ambient light source is the flickering light source and adjusting the brightness value of the display based on the calculated average value.

The electronic device according to certain embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101 or the electronic device 501). For example, a processor (e.g., the processor 520) of the machine (e.g., the electronic device 501) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. Some of the plurality of entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device comprising,
a housing including a front surface and a rear surface facing in a direction opposite to the front surface,
a display included in the housing and visually exposed through a portion of the front surface,
an illuminance sensor including a first modulator obtaining a first signal for first illuminance values during a first integration time and a second modulator obtaining a second signal for second illuminance values during a second integration time and disposed between the display and the rear surface to overlap an area of the display when viewed from above the front surface, the first modulator and the second modulator operating at least partially simultaneously, and
a processor positioned in the housing and operatively connected with the display, wherein the processor is configured to:
calculate the first illuminance values based on the first signal obtained through the first modulator,
calculate the second illuminance values based on the second signal obtained through the second modulator,
determine that an ambient light source is a flickering light source based on the second illuminance values,
if obtaining display parameter information associated with an image output through the display, compensate for the first illuminance values based on the display parameter information and adjust a brightness value of the display based on the compensated first illuminance values, and
if failing to obtain the display parameter information, adjust the brightness value of the display based on the second illuminance values.

2. The electronic device of claim 1, wherein the processor is configured to adjust brightness of the display based on the first illuminance values, if the processor determines that the ambient light source is not the flickering light source based on the second illuminance values.

3. The electronic device of claim 1, wherein the illuminance sensor includes a photodiode, and wherein the first modulator and the second modulator are connected to the photodiode.

4. The electronic device of claim 1, wherein the processor is configured to calculate the first illuminance values while adjusting the first integration time of the first modulator according to a display-on time period of the display.

5. The electronic device of claim 1, wherein the processor is configured to calculate the second illuminance values while maintaining the second integration time of the second modulator.

6. The electronic device of claim 1, wherein the second integration time of the second modulator is set to be shorter than a display-off time period of the display.

7. The electronic device of claim 1, wherein the processor is configured to determine that the ambient light source is the flickering light source, if a first condition and a second condition are met based on the second illuminance values.

8. The electronic device of claim 7, wherein the processor is configured to:
set a sampling number corresponding to a duty cycle of the display,
detect maximum illuminance values in sets of the second illuminance values corresponding to the sampling number, and if detecting a difference between the detected maximum illuminance values, determine that the first condition is met.

9. The electronic device of claim 7, wherein the processor is configured to:
calculate a standard deviation for sets of the second illuminance values corresponding to a display-on interval of the display, and
if the calculated standard deviation differs from a threshold, determine that the second condition is met.

10. The electronic device of claim 1, wherein the processor is configured to, if determining that the ambient light source is the flickering light source, calculate an average value for the second illuminance values and adjust the brightness value of the display based on the calculated average value.

11. A method for detecting a flickering light source surrounding an electronic device, the method comprising:
calculating first illuminance values based on a first signal obtained from a first modulator included in an illuminance sensor during a first integration time;
calculating second illuminance values based on a second signal obtained from a second modulator included in the illuminance sensor during a second integration time;
determining that an ambient light source is the flickering light source based on the second illuminance values;
when obtaining display parameter information associated with an image output through a display of the electronic device, compensating for the first illuminance values based on the display parameter information and adjusting a brightness value of the display based on the compensated first illuminance values; and
when failing to obtain the display parameter information, adjusting the brightness value of the display based on the second illuminance values,
wherein the first modulator and the second modulator operate at least partially simultaneously.

12. The method of claim 11, further comprising adjusting brightness of the display based on the first illuminance values, when determining that the ambient light source is not the flickering light source based on the second illuminance values.

13. The method of claim 11, wherein the illuminance sensor is disposed under at least a partial area of the display.

14. The method of claim 11, further comprising calculating the first illuminance values while adjusting the first integration time of the first modulator according to a display-on time period of the display.

15. The method of claim 11, further comprising calculating the second illuminance values while maintaining the second integration time of the second modulator.

16. The method of claim 11, wherein the second integration time of the second modulator is set to be shorter than a display-off time period of the display.

17. The method of claim 11, further comprising determining that the ambient light source is the flickering light source, when a first condition and a second condition are met based on the second illuminance values.

18. The method of claim 17, further comprising,
setting a sampling number corresponding to a duty cycle of the display;
detecting maximum illuminance values in sets of the second illuminance values corresponding to the sampling number; and
when detecting a difference between the detected maximum illuminance values, determining that the first condition is met.

19. The method of claim 17, further comprising,
calculating a standard deviation for sets of the second illuminance values corresponding to a display-on interval of the display; and
when the calculated standard deviation differs from a threshold, determining that the second condition is met.

20. The method of claim 11, further comprising,
calculating an average value for the second illuminance values, when determining that the ambient light source is the flickering light source; and
adjusting the brightness value of the display based on the calculated average value.

* * * * *